United States Patent
Nigam et al.

(10) Patent No.: US 11,526,786 B2
(45) Date of Patent: Dec. 13, 2022

(54) RECOMMENDING NETWORK CONNECTIONS BY OPTIMIZING FOR TWO-SIDED IMPLICIT VALUE OF AN EDGE

(71) Applicant: Microsoft Technology Licensing, LLC, Redmond, WA (US)

(72) Inventors: Aastha Nigam, Sunnyvale, CA (US); Parag Agrawal, Mountain View, CA (US); Aastha Jain, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 17/039,630

(22) Filed: Sep. 30, 2020

(65) Prior Publication Data

US 2022/0101159 A1    Mar. 31, 2022

(51) Int. Cl.
  *G06F 15/16* (2006.01)
  *G06N 5/04* (2006.01)
  *H04L 41/5009* (2022.01)
  *G06N 20/00* (2019.01)

(52) U.S. Cl.
  CPC ............... *G06N 5/04* (2013.01); *G06N 20/00* (2019.01); *H04L 41/5009* (2013.01)

(58) Field of Classification Search
  CPC ....... G06N 5/04; G06N 20/00; H04L 41/5009
  USPC ........................................................ 709/200
  See application file for complete search history.

(56) References Cited

U.S. PATENT DOCUMENTS

| | | | | |
|---|---|---|---|---|
| 2012/0155330 A1* | 6/2012 | Hammons, Jr. | ...... | H04W 40/248 370/255 |
| 2013/0318180 A1* | 11/2013 | Amin | ................ | G06Q 30/0251 709/206 |
| 2016/0162503 A1* | 6/2016 | Yao | ..................... | G06F 16/9535 707/723 |
| 2016/0226989 A1* | 8/2016 | Ovsiankin | .......... | G06Q 30/0243 |
| 2016/0255139 A1* | 9/2016 | Rathod | .............. | H04N 1/32101 709/203 |
| 2017/0004135 A1* | 1/2017 | Langston | ................ | H04L 51/52 |
| 2017/0031917 A1* | 2/2017 | Levanon | ........... | G06F 16/24578 |
| 2017/0060873 A1* | 3/2017 | Rathod | ................... | G06Q 50/01 |
| 2017/0161685 A1* | 6/2017 | Jennings | ............. | G06Q 30/0631 |

(Continued)

*Primary Examiner* — Moustafa M Meky
(74) *Attorney, Agent, or Firm* — Schwegman Lundberg & Woessner, P.A.

(57) ABSTRACT

Operations for facilitating establishment of connections in an online network are disclosed. A set of connection recommendations for a first entity associated with the online network is accessed. For each connection recommendation in the set of connection recommendations, a ranking value associated with the connection recommendation is accessed, a utility value corresponding to the connection recommendation is determined, and an adjusted the ranking value for the connection recommendation is calculated. The utility value is a two-sided utility value that combines a prediction of a utility of the first entity and a prediction of a utility of a second entity with respect to a key performance indicator. A set of connection recommendations is communicated for presentation in an interactive user interface of a client device associated with the first entity in accordance with the adjusted ranking value of each connection recommendation.

20 Claims, 13 Drawing Sheets

(56) References Cited

U.S. PATENT DOCUMENTS

2018/0359219 A1* 12/2018 Israel .................. H04L 63/0272
2020/0051025 A1*  2/2020 Gerace ............... G06Q 30/0273

* cited by examiner

PEOPLE YOU MAY KNOW — 102

ADAM APPLE   104
SOFTWARE ENGINEER AT COMPANY A
∞ 15 MUTUAL CONNECTIONS
[DISMISS] [CONNECT]

BETSY BANNANA
APP DEVELOPER AT COMPANY B
∞ 11 MUTUAL CONNECTIONS
106 [DISMISS]
108 [CONNECT]

CHARLES CHERRY
PRODUCT MANAGER AT COMPANY A
∞ 7 MUTUAL CONNECTIONS
[DISMISS] [CONNECT]

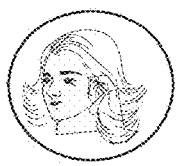
DIANE DATE
SOFTWARE ENGINEER AT COMPANY D
∞ 7 MUTUAL CONNECTIONS
[DISMISS] [CONNECT]

FRANK FIG
TEST ENGINEER AT COMPANY F
∞ 5 MUTUAL CONNECTIONS
[DISMISS] [CONNECT]

FIG. 1

| Feature | Description | Type |
|---|---|---|
| Needle/Needle lite similarity | Similarity between two members network structure | Pair |
| Profile embedding similarity | The profile embeddings provided by the standardization team is based on a member's school, company, title and skill information. We would like to include a similarity between two members. | Pair |
| Deep pymk similarity | Member embeddings learned using PYMK objective through a deep and wide network | Pair |
| Common Connection count | Number of common connections between two members | Pair |
| Transformed common connection | Transform common connection count feature as currently found valuable for cohorts. It is defined as follows: common-connections/sqrt(src connections)(dest connections) | Pair |
| PYMK offline score | Pymk offline score generated for PYMK candidates. | Pair |
| Same school | Are the src and dest at the same school? | Pair |
| Same company | Do src and dest work at the same company? | Pair |
| Same language | Is there an overlap between src and dest inferred languages? | Pair |
| Same geo | Do src and dest have the same geo listed? | Pair |
| Feed affinity score | Feed tracks out of network interactions between two members. Therefore, have the src and dest interacted before connection formation? | Pair |
| Interest similarity score | Are src and dest interested in similar topics? | Pair |
| Member level contribution | # of likes, comments, shares of member in the past week includes Feed, messages/InMail | Member |
| Contributions stats in Feed | # of likes, comments, shares of member in the past week within Feed only | Member |
| Invitation received | # of invitations received in the past week | Member |
| Transformed invitation received | transformed invt received = log (1+invt received) | Member |
| Network size for member | # of connection of a member | Member |
| Transformed network size | transformed n/w size = log(1+ connections count) | Member |
| Active network of member | # of public/private contributors in a member network | Member |
| MLC | Which MLC group does the member belong to? | Member |

FIG. 11

RECOMMENDING NETWORK CONNECTIONS BY OPTIMIZING FOR TWO-SIDED IMPLICIT VALUE OF AN EDGE

TECHNICAL FIELD

The subject matter disclosed herein generally relates to machine-learning and, more particularly, to techniques for generating and applying a model for determining a utility of the new connection in an online network for both the initiator and the receiver and adjusting rankings of recommendations for new connections based on the determined utility.

BACKGROUND

A connection of an entity, such as a member, teammate, contact, follower, group, company, event, page, newsletter, or hashtag, may play an important role in guiding activity of that entity with respect to an online network. For example, a large percentage of activity in a feed of a user of an online network and a large percentage of in-application notifications received by the user with respect to the online network may depend on activities of other entities in the online network to which the user is connected, including the quantity and quality of such connections.

Given the strong influence of an entity's network on key performance indicators of the online network, including counts of engagements and sessions, tools that help entities to grow their networks and build active communities (e.g., by enabling them to discover other entities) may have value. It is a difficult problem to ensure that resources of the online network, including processing power, memory, and bandwidth, are efficiently utilized to facilitate new connections between entities, because, for example, new connections for each entity may reach a point of diminishing returns with respect to improving key performance indicators of the online network.

BRIEF DESCRIPTION OF THE DRAWINGS

Various ones of the appended drawings merely illustrate example embodiments of the present disclosure and cannot be considered as limiting its scope.

FIG. 1 is a user interface for recommending new social connections to a user of an online network, according to some example embodiments.

FIG. 11 is a listing of example features used to train a utility model, including descriptions of each of the features.

DETAILED DESCRIPTION

Figure 2:
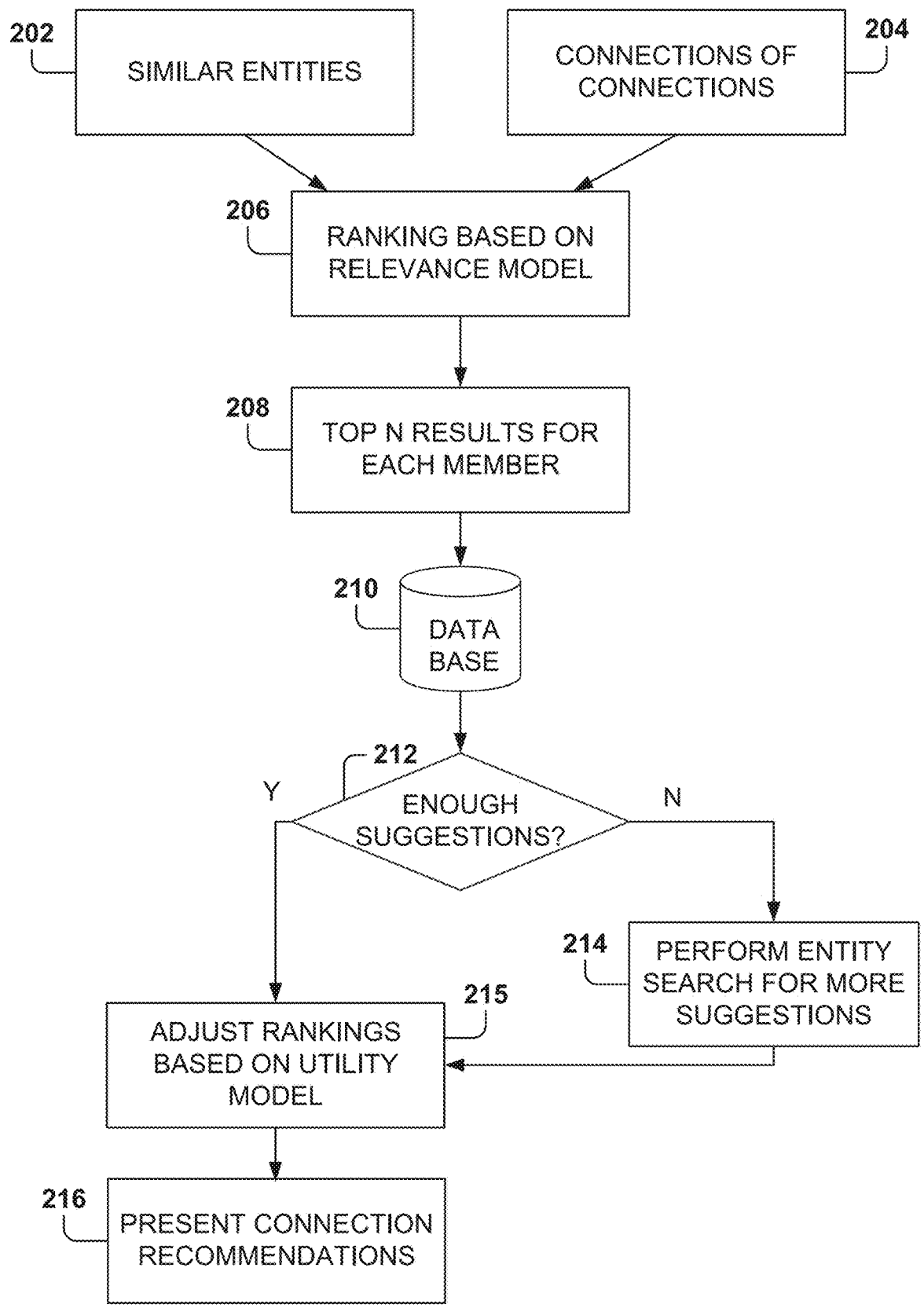
FIG. 2 is a flowchart of a method for identifying possible new connections, according to some example embodiments.

Example methods, systems, and computer programs are directed to improving rankings of recommendations of new connections based on generation and application of a machine-learned model for determining utilities of new connections for both an entity that would request the connection (a connector or initiator) and an entity that would receive the request (a connectee or receiver). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An online network may include a heterogeneous network of nodes in which a plurality of different node types and plurality of different edge types are permitted. In this context, a "type" refers to a class of items. In the case of nodes, each "type" may represent a different class of entities such that each class is represented by a data structure having different fields (in contrast with a data structure having the same fields but different values in the fields). Thus, for example, one node type may be "user" or "member," and may define a first set of fields that can be used to fill in information about a user, such as name, title, place of employment, skills, education, and so forth. A second node type may be a "company" or "organization," and may define a second set of fields that can be used to fill in information about an organization, such as industry, location, number of employees, market value, and so forth. A third node type may be a newsletter, and may define a set of fields that can be used to fill in information about the newsletter, such as title, author, topic, genre, and so forth. Other examples of node types include hashtags, groups, and events. An instance of a node type in the online network may be referred to as an entity.

In the case of edges, each "type" may represent a different intention for action between the corresponding edge. Examples of edge types may include connection edges (where a member generally connects to another member, and the intention for action is to permit two-way communication between the members), follow edges (where a member follows a hashtag/company/member, and the intention for action is for the member to be apprised of changes made to hashtag/company/member nodes or related to those nodes), and subscribe edges (where a member subscribes to group/newsletter/event, and the intention for action is for the member to be apprised of updates or new versions of the corresponding nodes).

Each edge may be either bidirectional or unidirectional. Bidirectional edges provide a link between the nodes that operates in both directions (e.g., from node A to node B and from node B to node A). A connection edge is an example of a bidirectional edge, as it works to allow the user corresponding to node A to communicate with the user corresponding to node B and vice-versa). Unidirectional edges provide a link between nodes that only operates in one direction (e.g., from node A to node B but not from node B to node A). Examples of unidirectional edges include subscribe edges and follow edges.

Suggestions for possible new edges in the network of nodes may be ranked and provided to members of the online network. In some cases, the suggestions include members connected to the connections of an entity, also referred to as connections of connections. An entity may have one or more first degree edges in the online network, which are direct or first-degree connections to other entitiesin the online network. Additionally, the entity may have one or more second-degree connections, which are connections, that are not directly connected to the entity but are connected to the entity's direct connections. For example, suggestions for one member to connect to another member may be referred to herein as "People You May Know" (PYMK). Edges may be established between any two entities supported by the online network, including entities of different types. As discussed above, types of entities may include connections, teammates, contacts, followed people, groups, events, pages, newsletters, hashtags, and so on.

In some cases, the possible new connections are ranked and suggested based similarities in characteristics (e.g., profile information). For example, in some solutions, suggestions may be generated by first looking at possible connections of connections, and if there are not enough people, additional suggestions are created by performing a search based on entity profile and activity data. Then the rankings of the connection recommendations may be adjusted based on a two-sided utility value representing a prediction of a downstream utility of both a first entity (a connector) and a second entity (connectee) with respect to a key performance indicator of the online network, such as a number of daily average users, a number of sessions engaged in by the users, or activity levels of the users of the online network.

Operations for facilitating establishment of connections in an online network are disclosed. A set of connection recommendations for a first entity associated with the online network is accessed. For each connection recommendation in the set of connection recommendations, a ranking value associated with the connection recommendation is accessed, a utility value corresponding to the connection recommendation is determined, and an adjusted ranking value for the connection recommendation is calculated. The determining of the utility value includes applying a machine-learned model to a set of input features identified as being relevant to the utility value. The utility value represents a prediction of an impact on a key performance indicator of the online network of an establishment of a connection corresponding to the connection recommendation. The utility value is a two-sided utility value that combines a prediction of a utility of the first entity and a prediction of a utility of a second entity with respect to a key performance indicator. A set of connection recommendations is communicated for presentation in an interactive user interface of a client device associated with the first entity in accordance with the adjusted ranking value of each connection recommendation. The interactive user interface includes a user interface element that, when activated by the first entity, facilitates establishment of a connection associated with the set of connections.

FIG. 1 is a PYMK user interface 102 for recommending new connections to a user of an online network, according to some example embodiments. The PYMK user interface 102 includes PYMK suggestions for a particular member of the online network. It is noted that the PYMK search for possible new connections may be initiated by the user by selecting an option in the online network, or the PYMK search may be initiated by the system and presented in some part of the online network user interface as an option with some initial suggestions.

The PYMK user interface 102 presents a plurality of member suggestions 104 and scrolling options for seeing additional suggestions. In some example embodiments, each member suggestion 104 includes the profile image of the member, the member's name, the member's title, the number of mutual connections, an option to dismiss 106 the member suggestion, and an option to request connecting 108 to the member suggestion. Mutual connections between two members of the online network are people in the online network that are directly connected to both members.

When the member selects the dismiss option 106, the dismissal is recorded by the online network. When the user selects the connect option 108, the online network sends an invitation to the selected member for becoming a connection. Once the selected member accepts the invitation, then both members become connections in the online network. Such user behavior with respect to the suggestions may be stored as user behavior data in a database of the online network. In example embodiments, such user behavior data may be used as one or more features that are input into the machine-learned model (e.g., as training data).

It is noted that the embodiments illustrated in FIG. 1 are examples and do not describe every possible embodiment. Other embodiments may show a different number of suggestions, include additional data for each suggestion or less data, present the suggestions in a different layout within the user interface, and so forth. Additionally, other embodiments may include suggestions for connections between any two types of entities supported by the online network, such as between a user and a group, between a user and a hashtag, and so on. The embodiments illustrated in FIG. 1 should therefore not be interpreted to be exclusive or limiting, but rather illustrative.

FIG. 2 is a flowchart of a method for identifying possible new connections for a target entity, according to some example embodiments. In some example embodiments, the system identifies entities (e.g., members) having profile data that is similar to the profile data of the target entity. Additionally, the system may identify connections of connections of the target member. Such features may be input into a machine-learned model for generating a first-pass ranking score for each entity with respect to the target entity.

For example, connections of connections of the target entity are identified as possible suggestions. If there are not enough suggestions, the system may expand the search of candidates by making a search for entities having profile data that is similar to the target entity. For example, such profile data may include industries, skills, jobs, companies, and so on associated with the entities.

At operation 202, candidates having similarities to the target entity are identified. For example, school or company affiliations are compared. As used herein, a school refers to any educational institution that the member attended, such as high school, university, technical school, professional school, academy, and the like.

At operation 204, the connections of connections of the target entity are identified. For example, a connection tree of the online network is traversed. The connection tree is a representation of the connections within the online network where entities are the nodes and connections are established between the nodes.

At operation 206, a machine learning algorithm is utilized to score the candidates identified in operations 202 and 204. In some example embodiments, the machine learning algorithm is a relevance model ranking algorithm (e.g., a logistic regression model), but other machine learning algorithms may be utilized. More details on the machine learning algorithm are provided below with reference to FIG. 9.

In some example embodiments, the machine learning algorithm is trained utilizing entity activity in the online network and entity profile data. For example, the machine learning algorithm analyzes the history of suggestions shown to members in the online network and how often those suggestions become connection requests by the members of the online network. The machine learning algorithm may also be trained by analyzing existing connections and similarities between connections.

Other features utilized by the machine learning algorithm may include how many common connections the target entity has with a candidate entity, whether the target entity and the candidate are associated the same school, whether the target entity the candidate entity are associated with the same company, a number of shared connections, and so forth.

At operation 208, a top number (e.g., n) of results are identified for the target entity as possible suggestion (e.g., PYMK) candidates. In some example embodiments, the top n entities selected are stored in a database 210 or some other type of memory.

In some example embodiments, the candidates of operation 208 are pregenerated off-line by the system (e.g., the list of candidates is created even before a connection request is detected). For example, the list of candidates may be pre-generated once a day (or with some other frequency) for at least some of the members of the online network (e.g., for the members within a country or a region).

At operation 212, a check is made to determine if there are enough candidate members that may be used as suggestions (e.g., for presenting in the PYMK user interface). For example, a check is made to determine if the list of candidates includes at least a predetermined threshold number of entities. If there are enough candidates (e.g., the number of results exceeds the threshold), the method flows to operation 216, but if there are not enough candidates above the threshold number, the method flows to operation 214.

At operation 214, a search is made for additional entities in the online network that are similar to the target entity. The search may include a few data fields from the profile of the entity or a large number of fields from the profile of the entity. For example, in some embodiments a limited number of fields are used, such as title, company, and school. In other embodiments, additional or different fields may be used for the connection search. At operation 216, the identified members are presented, sorted based on the first-pass ranking score generated and assigned to each of the candidates.

Figure 3:
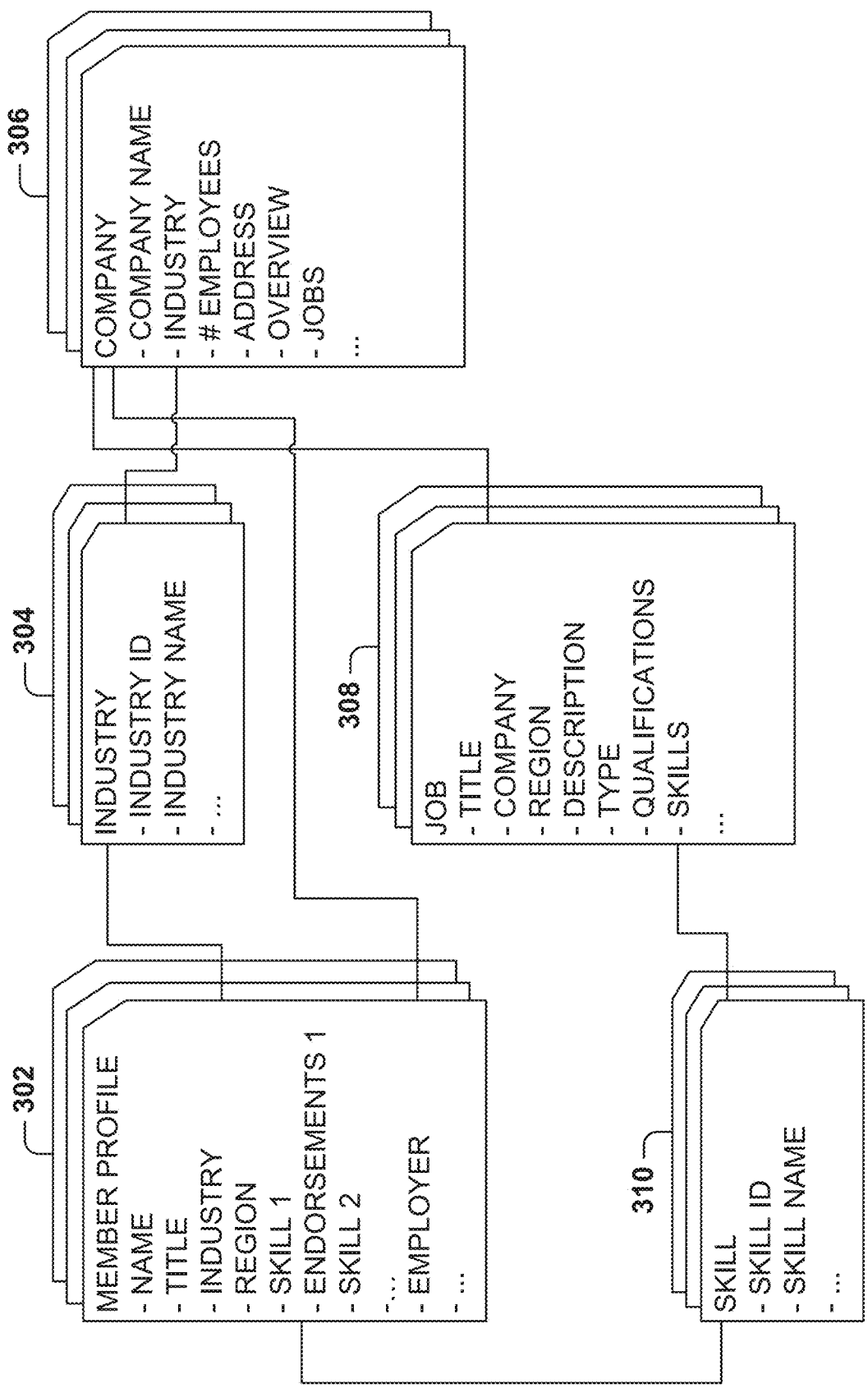
FIG. 3 illustrates data structures for storing entity profile information, according to some example embodiments.

FIG. 3 illustrates data structures for storing entity profile information, according to some example embodiments. Each entity in the online network has an entity profile 302, which includes information about the entity. The entity profile is configurable by a user represented by the entity (or an administrator associated with the entity). The profile may also include information based on the entity activity in the online network (e.g., likes, posts read).

In one example embodiment, for entities of the member type, profile 302 may include information in several categories, such as experience, education, skills and endorsements, accomplishment, contact information, following, and the like. Skills include professional competences that the member has, and the skills may be added by the member or by other members of the online network. Example skills include C++, Java, Object Programming, Data Mining, Machine Learning, Data Scientist, and the like. Other members of the online network may endorse one or more of the skills and, in some example embodiments, the account is associated with the number of endorsements received for each skill from other members.

The entity profile 302 includes entity information, such as name, title (e.g., job title), and associated industries (e.g., legal services), geographic regions, employers, skills, endorsements, and so forth. In some example embodiments, for entities of the member type, the entity profile includes job related data, such as jobs previously applied to, or jobs already suggested to the member (and how many times the job has been suggested to the member). Within the entity profile 302, skill information may be linked to skill data 310, the employer information may be linked to company data 306, and the industry information may be linked to industry data 304.

For entities of the member type, experience information may include information related to the professional experience of the member. In one example embodiment, the experience information includes an industry 304, which identifies the industry in which the user works. In one example embodiment, the user is given an option to select an industry from a plurality of industries when entering this value in the profile. In other example embodiments, the user may also enter an industry that is not in the list of predefined industries. In some example embodiments, the industry is defined at a high level. Some examples of industries configurable in the user profile include information technology, mechanical engineering, marketing, and the like. The experience information area may also include information about the current job and previous jobs held by the user.

The skills 310 and endorsements may include information about professional skills that the user has identified as having been acquired by the user, and endorsements entered by other users of the online network supporting the skills of the user. Accomplishments include accomplishments entered by the user, and contact information includes contact information for the user, such as email and phone number.

The industry data 304 is a table for storing the industries identified in the online network. In one example embodiment, the industry data 404 includes an industry identifier (e.g., a numerical value or a text string), and an industry name, which is a text string associated with the industry (e.g., legal services).

In one example embodiment, the company data 306 includes company information, such as company name, industry associated with the company, number of employees, address, overview description of the company, job postings, and the like. In some example embodiments, the industry is linked to the industry data 304.

The skill data 310 is a table for storing the different skills identified in the online network. In one example embodiment, the skill data 310 includes a skill identifier (ID) (e.g., a numerical value or a text string) and a name for the skill. The skill identifier may be linked to the member profiles 302 and job data 308.

In one example embodiment, job data 308 includes data for jobs posted by companies in the online network. The job data 308 includes one or more of a title associated with the job (e.g., software developer), a company that posted the job, a geographic region for the job, a description of the job, a type of job, qualifications required for the job, and one or more skills. The job data 308 may be linked to the company data 306 and the skill data 310.

It is noted that the embodiments illustrated in FIG. 3 are examples and do not describe every possible embodiment. Other embodiments may utilize different data structures, fewer data structures, combine the information from two data structures into one, add additional or fewer links among the data structures, and the like. The embodiments illustrated in FIG. 3 should therefore not be interpreted to be exclusive or limiting, but rather illustrative.

Figure 4:
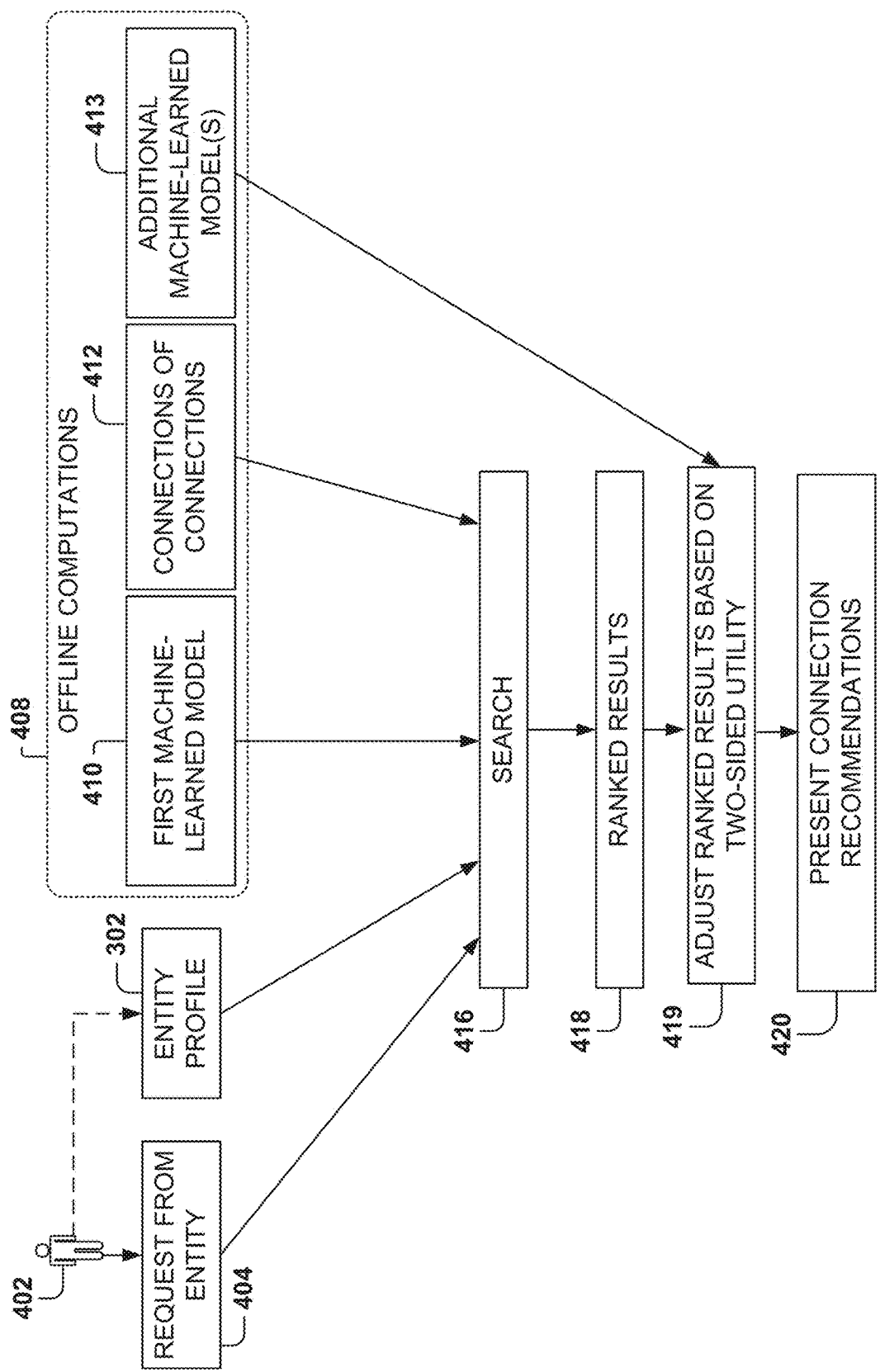
FIG. 4 illustrates the architecture for identifying possible new connections utilizing offline computations, according to some example embodiments.

FIG. 4 illustrates the architecture for identifying possible new connections for a target entity, according to some example embodiments. FIG. 4 illustrates a first machine-learned algorithm 410 that "blends" the search for connections of connections of the target entity and for entities similar to the target entity. The algorithm 410 takes into account the value of different search features for finding the best PYMK candidates.

To determine suggestions for a target entity 402, with entity profile 302, a request 404 is initiated by the online network. In example embodiments, some offline computations 408 are performed by the online network even before the request is detected. The offline computations 408 include training one or more of a first machine-learned model for calculating a first-pass ranking, calculating connections of connections 412 of the target entity, and training of one or more additional machine-learned models 413 (e.g., including a machine-learned model for predicting utility of the candidate connections, described in more detail below).

The training of the first machine-learned model 410 includes identifying a first set of features relevant to determining a first set of candidate connections the are relevant to the target entity and determining first-pass ranking scores for each of the candidate connections based on a strength of the relevancy of each candidate connection. The training of the additional machine-learned models includes determining one or more additional sets of features relevant to determining second-pass ranking scores for each of the candidate connections. For example, the additional machine-learned models 413 can be trained to provide adjustments to each of the first-pass ranking scores based on various factors, such as a probability that a connectee will attempt to establish the recommended connection with a connector, a probability that a connector will accept a request to establish the connection from the connectee. Or the additional-machined learned models 413 can adjust each of the first first-pass ranking scores based on two-sided utility (e.g., a combination of a predicted downstream utility to the connector and a predicted downstream utility the connectee, as discussed in more detail below).

The result of the training of the models 410 and 413 are trained machine learning programs, such as plug-ins that are utilized by a search engine for generating entity suggestions that are optimized with respect to a key performance indicator, such as downstream utility.

Calculating the connections of connections 412 includes traversing the online network graph to identify the connections of connections for each of the entities, or at least for a plurality of the entities of the online network (e.g., entities associated within a range of a geographical location, such as a country, that is associated with the target entity).

At operation 416, a search is made for candidate entities, where the search takes into consideration the target entity, the target entity profile 302, and the connections of connections 412. In some example embodiments, the search is an Elasticsearch, but other search algorithms may be utilized. Elasticsearch is a search engine that provides a distributed, multitenant-capable full-text search engine with a hypertext transfer protocol (HTTP) web interface and schema-free JSON documents.

The search in operation 416 generates a list of candidates 418 and associates a first-pass ranking score with each candidate (e.g., based on the application of the first machine-learned model 410). In example embodiments, the list of candidates is sorted by the first-pass ranking score. The candidates may include connections of connections as well as entities with profiles similar to the target entity (e.g., to which the suggestions may be offered via user interface). At operation 419, the ranked results are adjusted based on an additional machine-learned model 413 (e.g., to adjust the ranked results based on two-sided utility, as explained in more detail below.

A predetermined number of PYMK candidates from the top of the list are selected for presentation to the user at operation 420.

Instead of doing separate searches for connections of connections and similar members, a blended search is performed taking into account profile data as well as connectivity data. This improves the quality of the PYMK suggestions generated by the online network.

Figure 5:
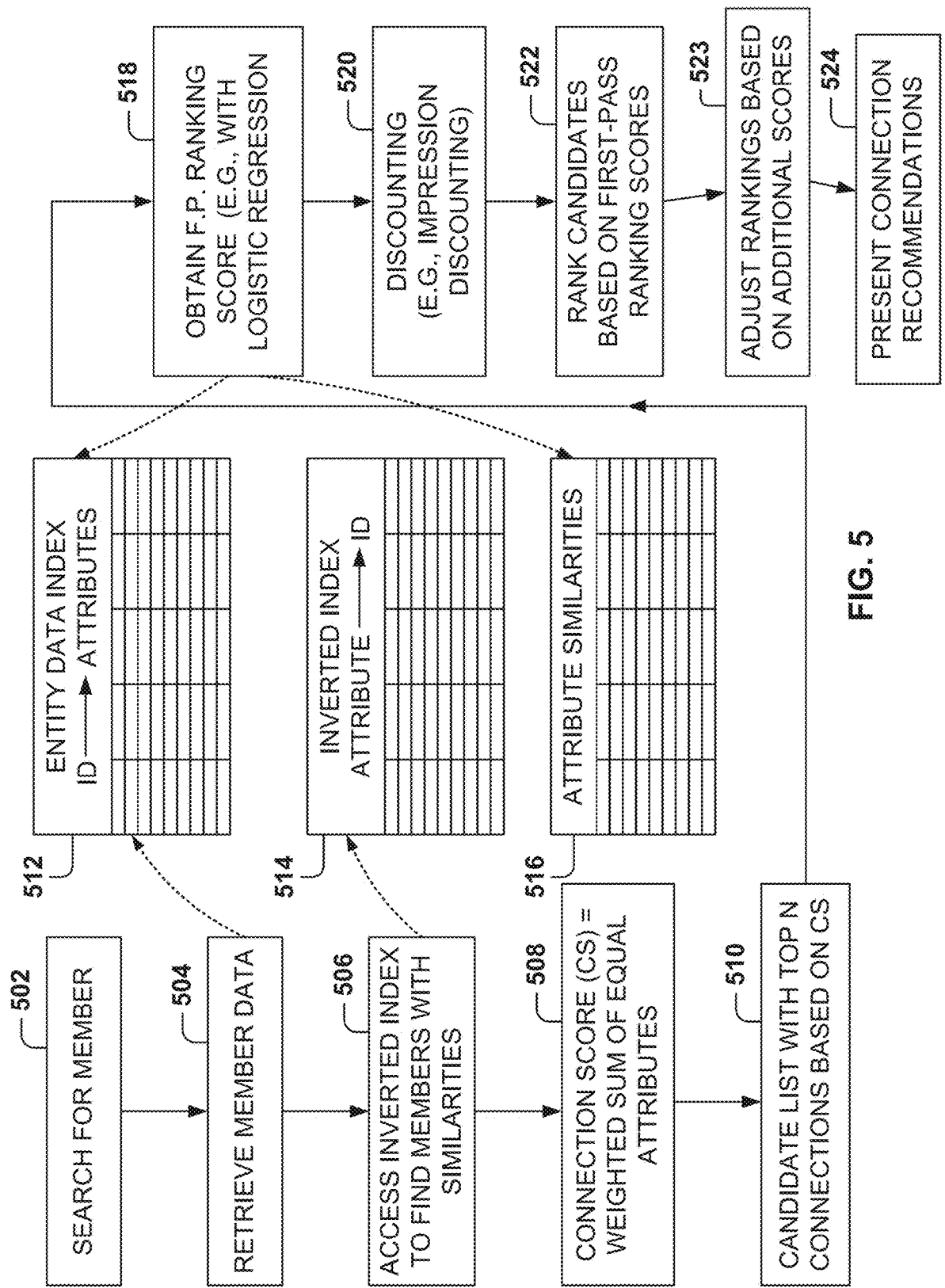
FIG. 5 illustrates a method for generating possible new connections by blending the search for similar entities with connections of connections, according to some example embodiments.

FIG. 5 illustrates a method for generating a first-pass ranking of possible new connections by blending the search for similar members with connections of connections and generating a second-pass ranking of the possible new connections, the second-pass ranking adjusting the first-pass rankings based on downstream utility, according to some example embodiments. FIG. 5 provides more detail to the search described above with reference to FIG. 4.

In example embodiments, the search has two phases: a retrieval phase followed by a ranking phase. In the retrieval phase, a large number of candidates are identified. In the ranking phase, the candidates are evaluated to determine a list of candidates sorted by their potential value as suggestions. In other words, the retrieval phase assures that good candidates are not lost in the search and the ranking phase fine tunes the value of the candidates for presentation. It is noted that the retrieval search may utilize one or more inverted indexes and the ranking phase may utilize a forward index.

At operation 502, a search is initiated for a target entity. At operation 504, entity data is retrieved. For example, the entity data is accessed from the entity data index 512 that includes profile data. In one example embodiment, the entity data index 512 is indexed by entity ID, and the member data index 512 includes attributes associated with the entity ID. The attributes may be any of the attributes found in the profile of the entity, as discussed above, such as an associated title, school, company, and so forth.

At operation 506, one or more inverted indices are accessed to find entities of the online network with similarities to the target entity. The similarities may be for any of the fields identified in the profiles of the entities, and for simplicity of description, the similarities also may include being a connection of a connection.

In some example embodiments, the attributes utilized in the first phase are user title, user industry, work companies, school or schools, and common connections (e.g., connections of connections). Other embodiments may utilize different fields, additional fields, fewer fields, and so forth.

The online network builds the inverted indices offline to be able to perform candidate searches that are quick and cheap (in the amount of computing resources utilized). An inverted index 514 is indexed by the corresponding attribute to access entity IDs having that value. For example, if the entity is associated with Stanford University, the inverted index of school to entity ID is accessed to retrieve the entities that are associated with Stanford University. Similarly, order inverted indices may be used for the title, the school, connections of connections, and the like. The inverted indices may be very large if the online network has a large number of members, so a limited set (e.g., 2 to 4) of the attributes are used for this search and the corresponding (e.g., 2 to 4) indices are created. However, other implementations may include additional fields and create additional indices.

At operation 508, a connection score CS is calculated for a plurality of entities of the online network. In some example embodiments, the CS is calculated as a weighted sum for attributes that are equal between the target entity and the candidate entity. The $CS(m, C_i)$ is the connection score when searching for candidate m for a candidate $C_i$, and may be calculated with the following equations:

$$CS(m, C_i) = \sum_j w_j \cdot AC_j(m, C_i);$$

$$AC_j(m, C_i) = \begin{pmatrix} 1 & \text{if } A_j(m) = A_j(C_i) \\ 0 & \text{if } A_j(m) \neq A_j(C_i) \end{pmatrix}$$

Where $w_j$ is a weight assigned to an attribute Aj, and $AC_j(m, C_i)$ is a function, referred to as attribute comparison for attribute $A_j$ between entities m and $C_i$, such that if entity m and candidate $C_i$ have an equal value for attribute $A_j$, then $AC_j(m, C_i)$ is equal to 1, and if they have a different value, then $AC_j(m, C_i)$ is equal to 0.

Therefore, $CS(n,C_i)$ is a sum for all attributes in consideration of $AC_j(m,C_i)$. In other words, $CS(m,C_i)$ is a sum of all $w_j$s for all attributes where the entity and the candidate have the same value (e.g., same title for m and $C_i$, or m and $C_i$ are connections of connections).

It is noted that in other embodiments, other types of calculations may be used to calculate the CS, such as by utilizing an average, or a count of ACs equal to 1, a multiplication of factors, and the like.

For example, if CS is calculated using title, education, and connections of connections, the equation could be expressed as follows:

$CS(C_i)=w_1(m \text{ title}=C_i \text{ title})+w_2(m \text{ school}=C_i \text{ school})+$
$w_3(m \text{ and } C_i \text{ are connections}^2)$ From operation 508, the method flows to operation 510 where a candidate list is generated with a predetermined number of candidates with the best CS score. For example, the system may select 1000 or 5000 candidate entities, although other embodiments may utilize a different number of candidates.

The ranking phase starts at operation 518, where the first-pass ranking score is calculated for each of the candidates selected in operation 510. In one example embodiment, the ranking score is calculated using a logistic regression model utilizing similarity calculations, represented by attribute similarities table 516. The attributes used for similarity calculations may be the same attributes utilized in the first phase or different attributes may be utilized for the ranking phase. The machine learning algorithm utilizes a plurality of features for obtaining the ranking score. For example, the higher the number of common connections the member has with the candidate, the higher the ranking score for the candidate.

The entity data index 512 is a forward index that maps entity ID to attribute values and is used to obtain the attribute values of the candidates in consideration.

At operation 520, some of the candidates may be discounted based on past user activity. For example, candidates that have been presented a few times to the member, but whom the member has never selected, may be discarded from further consideration.

At operation 522 the remaining candidates are ranked based on the first-pass ranking score.

At operation 523, the remaining candidates are re-ranked based on a second-pass ranking score (e.g., to optimize the rankings based on two-sided downstream utility, as discussed in more detail below).

At operation 524, a predetermined or configurable number of the best candidates are selected (e.g., for presentation to the member via a user interface, such as the PYMK user interface).

This method blends searching for common connections with searching with entities with similarities. It provides a smooth transition for new entities, which have none or few connections, to more senior entities that have a large number of connections. As the number of connections grow, the connections of connections factor may grow in relevance as the number of possible candidates for this category grows. It doesn't matter if the entity is a new member or not, the online network will always find some suggestions for the entity. However, the system will also continue to search for candidates in the online network that have similarities with the entity.

Figure 6:
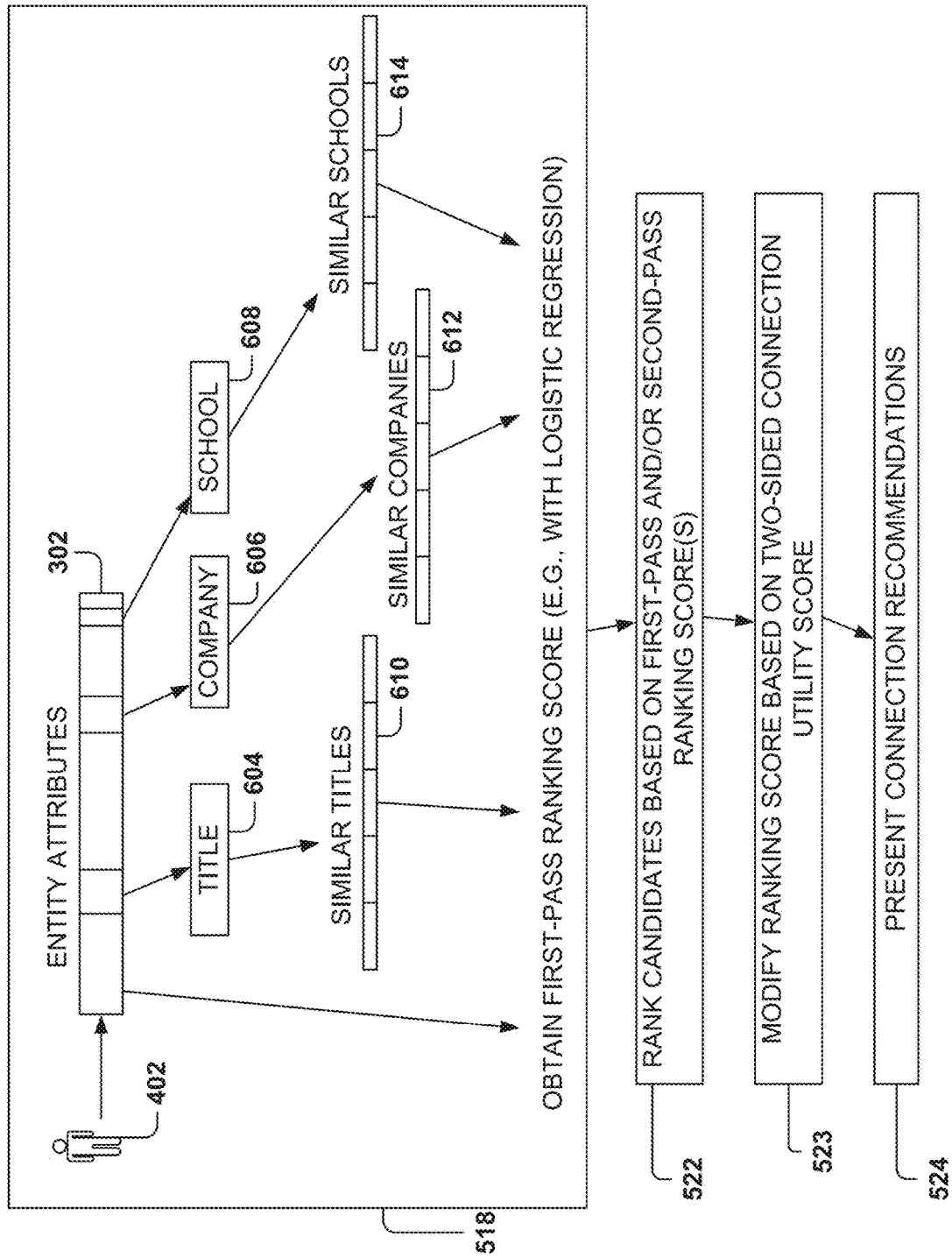
FIG. 6 illustrates the details for ranking possible new connections, according to some example embodiments.

FIG. 6 illustrates details for a first-pass ranking of possible new connections for a target entity, according to some example embodiments. When performing a search for entity 402, the entity attributes 302 are assessed for finding candidates. In the example illustrated in FIG. 6, similar titles 610 are determined for title 604, similar companies 612 are determined for company 606, and similar schools 614 are determined for the school or schools 608 of member 402. It is noted that the entity may be associated with one or more companies and one or more schools, so all the company values and school values are entered for the search of similar companies or schools.

It is noted that each similar title may include a similarity value for weighing the similarity, such that some titles may be more similar than others, therefore making them more relevant.

At operation 518, the first machine-learning program obtains the first-pass ranking score (e.g., utilizing off-line logistic regression), taking into consideration the similar titles 610, the similar companies 612, the similar schools 614, and the attributes 302 of the entity profile. In addition, the machine-learning program may consider other data (not shown), such as member activities in the online network.

At operation 522, the candidates are ranked based on the first-pass ranking scores.

At operation 523, the first-pass ranking scores are adjusted by one or more additional machine-learning programs, such as a machine-learning program that generates second-pass ranking scores. For example, the first-pass ranking scores are adjusted based on two-sided downstream utility, as discussed in more detail below.

At operation 524, the candidates are presented to the member 402 (e.g., via the PYMK user interface).

Figure 7:
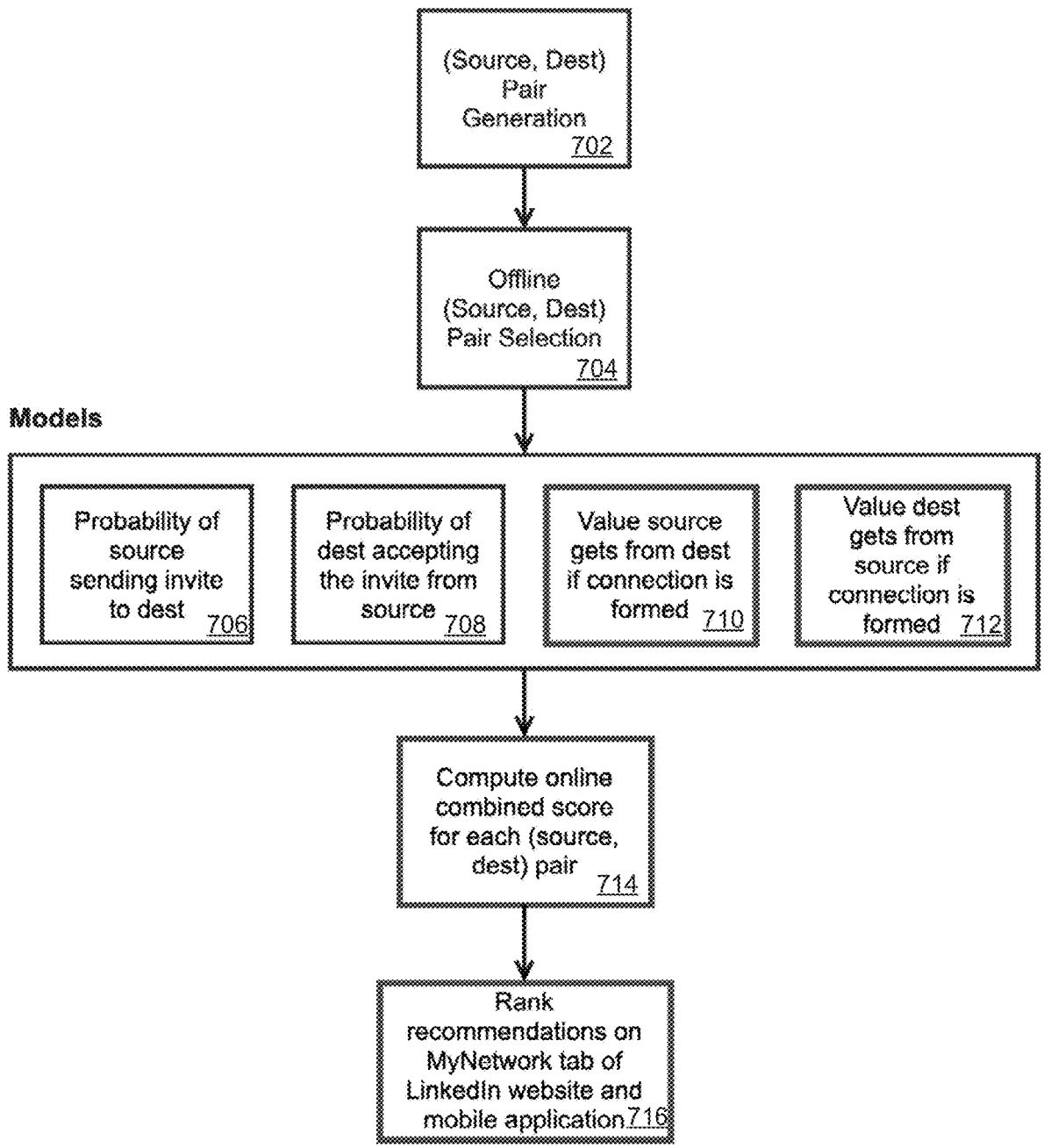
FIG. 7 is a block diagram illustrating use of an additional machine-learned model for optimizing rankings of candidates based on two-sided utility.

FIG. 7 is a block diagram illustrating use of an additional machine-learned model for optimizing rankings of candidates based on two-sided utility.

Ideally, as an entity grows its network, every new edge it forms (whether it is by connecting with a member, by joining a group, or by following a hashtag) should increase the total value/utility the entity derives from its network. However, an increase in the entity's total utility is only attainable if every new connection it forms provides a positive non-zero marginal/incremental value. However, as an entity grows its network, the entity may receive a diminishing marginal utility.

Moreover, the utility of a connection is driven by a multitude of factors such as the current network size of the entity. For example, entities having a smaller network might find it valuable to grow their member connections whereas entities with larger networks might be looking to discover new content through follow edges. Therefore, understanding the utility of a new connection is an important signal for identifying more relevant recommendations.

In example embodiments, an additional machine-learned model is built to estimate the downstream utility of a heterogeneous edge between a target entity and an additional entity, including an edge between entities of different types, if they connect. In example embodiments, the machine-learned utility model is a second-pass model that can be used in conjunction with or as an alternative to one or more other second-pass ranking models, such as an edge value model (EVM), a connection strength score (CCX), or a PYMK model.

In example embodiments, EVM optimizes for the probability of an interaction over a time period (e.g., the next 28 days) over a new edge. For a given Source (e.g., connector) and Dest (e.g., connectee) pair, a response variable is derived from private and public contributions between the pair after the connection was formed. In example embodiments, EVM uses entity-level features obtained at the time of impression. EVM is optimized for the probability of interaction after the connection is formed, e.g., p(interactions|connection), instead of the actual number of interactions, e.g., (E[interactions|connection]). More concretely, let's say after the connection, ui and uj interact 20 times, whereas ui and uk interact 2 times. Using the edge value model, both uj and uk are treated equally for ni since it predicts probability of interaction rather than E[interactions]. However, we can see that uj may be more valuable to ui than uk. Therefore, it may be important to optimize for downstream utility a new connection brings.

CCX measures the strength of an existing connection for different contexts. The strength is measured by modeling the probability of interaction over a next time period (e.g., over the next 28 days) for a set of contexts, including a private context and a public context. For the modeling, it leverages an entity pair, activity, and interest features. Some differences between EVM and CCX include: 1) EVM is typically an online model whereas CCX is typically an offline model and 2) EVM scores unconnected pairs, whereas CCX scores connected edges.

CCX is a classification model that predicts the probability of interaction for an existing connection, which is used as a proxy for the strength of the connection between two entities.

The PYMK model may optimize for P(invitation sent and accepted|impression). Or, alternatively, the PYMK model may optimize for pInvite=p(invite|impression) and pAccept=p(accept|invitation) through the following formulation:

$p\text{Invite}(1+\alpha p\text{Accept})$

Thus, the PYMK model predicts the probability of a particular type of interaction, specifically probabilities related to whether a candidate recommendation will be selected by a connector for sending to a connectee as an invitation and whether the connectee will accept the invitation, thus forming the connection.

Thus, in example embodiments, the EVM, CCX, and PYMK models consider probabilities of interactions, but not the utility of an edge, when used to generate second-pass rankings to optimize first-pass rankings of candidate connections for a target entity. The utility model discussed below goes beyond probabilities of interactions and predicts the utility of an edge.

For two members, the downstream utility can be defined in multiple ways, such as their interest in each other's notifications or their affinity to have conversations. For example, downstream utility can be defined based on any of the following (e.g., as response variables):

1) Contribution utility. For example, total number of contributions (private and public) over the newly formed edge for a given period of time. The total number of contributions may include an increase in contributions by the connector and an increase in contributions by the connectee. Example contributions may include feed contributions, message contributions, and so on.

2) Session utility. The session utility may include an increase in a number of sessions by the connector and an increase in sessions by the connectee. An example measurement may be a total number of notifications clicked divided by impressed over the newly formed edge for a given period of time. Another example measurement may be a number of notifications generated by the source for dest to model dest utility and number of notifications generated by dest for source to model source utility.

3) Network growth utility. For example, total number of new connections (from the source's and dest's first degree network) that were formed due to this newly formed edge for a given period of time.

4) Retention utility. For example, how much would forming a connection help increase a probability of retaining the connectee on the platform (e.g., including, when the conectee is not active on the system? Likewise, how much would forming the connection increase a probability of retaining the connector?

Let us define utility, U(i), as the value member ui derives from its current network. After the formation of a new connection with entity ej (such as member, group and company) the utility of ui changes to U'(i). In order to compute the incremental value of the newly formed connection for ui, we would model it as follows:

$\Delta U = U'(i) - U(i)$

However, if we model ΔU in this form it is difficult to attribute the change to the new connection with ej. Therefore, we approximate ΔU with the downstream utility over the edge as
$e\text{Utility} = U(i,j)$.

The utility model estimates the downstream utility of a newly formed connection. In example embodiments, the utility model is a log-linear regression model that predicts the utility over an edge: (eUtility=E[utility|connection]). For a given pair, the predicted value of this model is applied to the PYMK second pass ranker (e.g., after the first-pass ranker) to help recommend connections that maximize downstream utility as follows:

PYMK(1+α$e$Utility)

where, PYMK optimizes for p(invitation sent and accepted impression). The impact of the utility model on the reranking will be controlled by α∈[0, 1]. Or:

$p$Invite(1+α$p$Accept+β$p$Accept $e$Utility)

where, β∈[0, 1]

Or, in a simplified variation:

$p$Invite+α$p$Invite $p$Accept+$p$Invite $p$Accept
(βsourceUtility+γdestUtility)

Thus, with the utility model, the value Source will get from Dest is considered in combination with the value Dest will get from Source if the new connection is formed (e.g., through a request by the connector and an acceptance of the request by the connectee).

To further illustrate, let's say we have three members, A, B and C—where A is not connected to B and C. PYMK may compute the following scores: probability of A sending an invitation to B if B is shown on their PYMK recommendation page and the probability of B accepting the invitation from A. The same score is computed for C. If the score between pair (A,B) is higher than the score for pair (A,C), then B is ranked higher than C in A's PYMK recommendation list (that is, B is boosted in A's user interface).

Here, we jointly estimate the implicit downstream value of the edge by directly estimating the expectation. This joint expectation estimation is done instead of performing two steps a) by building two models one for value (connection) and another for probability of interaction given connection represented as P(interaction|connection), b) summation over possible interactions. The two-step solution may be intractable and the summation may motivate engineers to apply heavy approximations, leading to a suboptimal model. To avoid such approximation and suboptimal solution, the disclosed system directly estimates the value of the connection.

An example model may select a sessions-based utility model, where sessions are approximated based on the number of notifications an edge can generate for both source and dest after a predetermined number of days of its formation (e.g., 28). A log linear regression model is built to estimate a utility function. The function incorporates past user behavior (activity and interactions), content interests, network structural information and geographical information to learn the function. In example embodiments, deep neural networks may also be used for learning estimation functions.

At operation 702, (Source, Dest) pairs are generated (e.g., for candidates selected through first-pass ranking).

At operation 704, a predetermined or configurable top number of (Source, Dest) pairs are selected (e.g., based on their first-pass ranking scores).

At 706-712, a second-pass ranking model, such as one of the PYMK models, is modified to optimize for two-way utility, as discussed above.

At operation 714, the utility model is applied (e.g., as a second-pass ranking) to the top number of (Source, Dest) pairs to compute a two-way utility value for each (Source, Dest) pair. For example, every unconnected top pair at the time of online serving may be scored with our function (e.g., pInvite+α*pInvite*pAccept+pInvite*pAccept (β*sourceUtility+γ*destUtility).

At operation 716, the reranked top number of candidate entities are presented in the PYMK user interface, such as in the MyNetwork tab of the LinkedIn web site or mobile application, providing the target entity (or administrator of the target entity) to invite any one of the candidate entities to form a connection with the target entity.

Measurement of impact. In example embodiments, it may be important to correctly measure the impact of the reranking of the candidates on both the senders of the invitation and the receivers of the invitation. To that end, a novel dual lix setup may be used—one lix for the source and an orthogonal lix for the dest. This setup allows us to have precise measurement and reduce commonly observed network effects. The dual lix setup may be leveraged for A/B testing and to measure the impact of the experiment.

Figure 8:
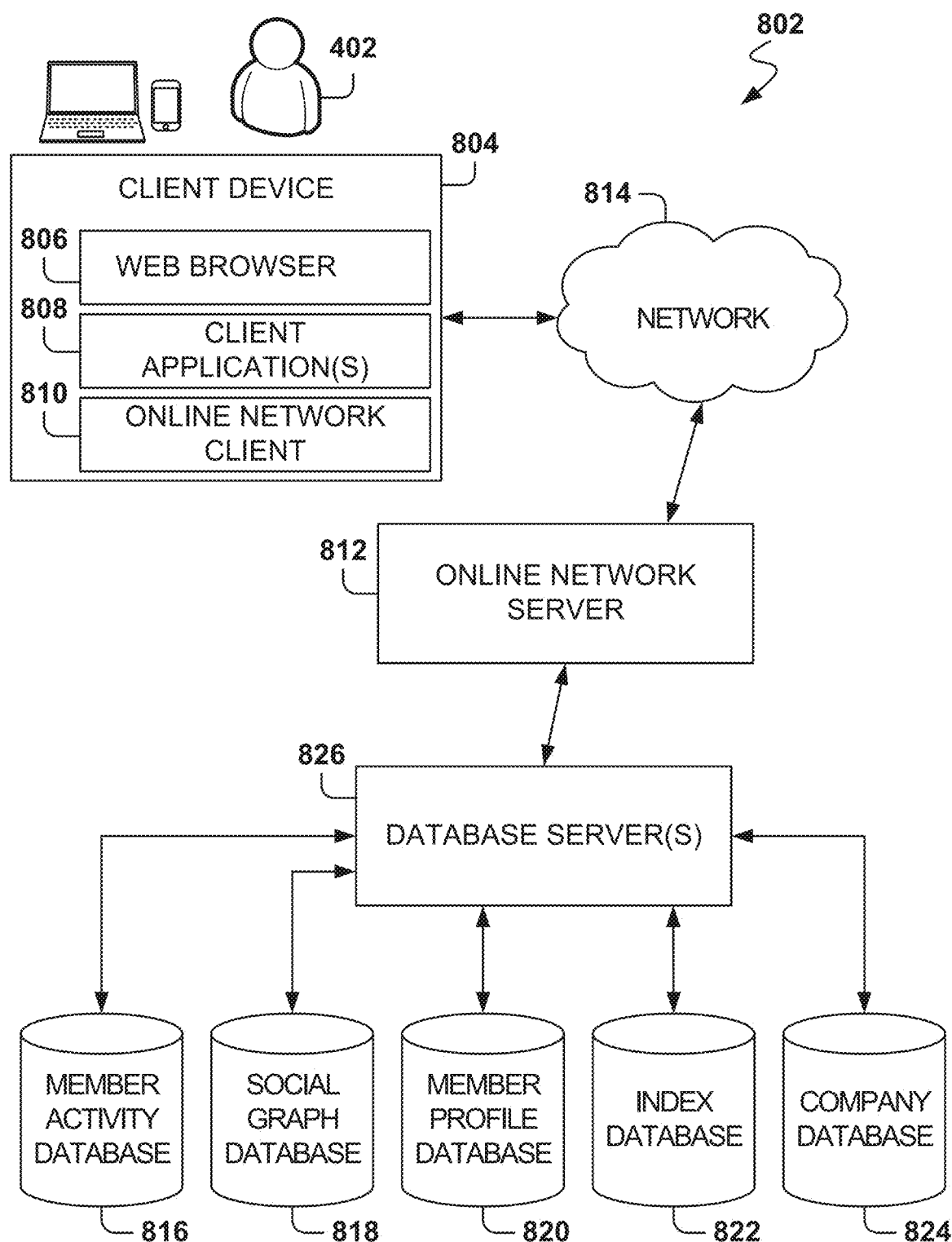
FIG. 8 is a block diagram illustrating a networked system, according to some example embodiments, including an online networking server.

FIG. 8 is a block diagram illustrating a networked system, according to some example embodiments, including an online networking server 812, illustrating an example embodiment of a high-level client-server-based network architecture 802. The online networking server 812 provides server-side functionality via a network 814 (e.g., the Internet or a wide area network (WAN)) to one or more client devices 804. FIG. 8 illustrates, for example, a web browser 806 (e.g., the Internet Explorer® browser developed by Microsoft® Corporation), client application(s) 808, and an online networking client 810 executing on a client device 804. The online networking server 812 is further communicatively coupled with one or more database servers 826 that provide access to one or more databases 816-824.

The client device 804 may comprise, but is not limited to, a mobile phone, a desktop computer, a laptop, a portable digital assistant (PDA), a smart phone, a tablet, an ultra book, a netbook, a multi-processor system, a microprocessor-based or programmable consumer electronic system, or any other communication device that a user 402 may utilize to access the online networking server 812. In some embodiments, the client device 804 may comprise a display module (not shown) to display information (e.g., in the form of user interfaces). In further embodiments, the client device 804 may comprise one or more of touch screens, accelerometers, gyroscopes, cameras, microphones, global positioning system (GPS) devices, and so forth.

In one embodiment, the online networking server 812 is a network-based appliance that responds to initialization requests or search queries from the client device 804. One or more users 402 may be a person, a machine, or other means of interacting with the client device 804. In various embodiments, the user 402 is not part of the network architecture 802, but may interact with the network architecture 802 via the client device 804 or another means. For example, one or more portions of the network 814 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 804 may include one or more applications (also referred to as "apps") such as, but not limited to, the web browser 806, the online networking client 810, and other client applications 808, such as a messaging application, an electronic mail (email) application, a news application, and the like. In some embodiments, if the online networking client 810 is present in the client device 804, then the online networking client 810 is configured to locally provide the user interface for the application and to communicate with the online networking server 812, on an as-needed basis, for data and/or processing capabilities not locally available (e.g., to access a member profile, to authenticate a user 402, to identify or locate other connected members, etc.). Conversely, if the online networking client 810 is not included in the client device 804, the client device 804 may use the web browser 806 to access the online networking server 812.

Further, while the client-server-based network architecture 802 is described with reference to a client-server architecture, the present subject matter is of course not limited to such an architecture, and could equally well find application in a distributed, or peer-to-peer, architecture system, for example.

In addition to the client device 804, the online networking server 812 communicates with the one or more database server(s) 826 and database(s) 816-824. In one example embodiment, the online networking server 812 is communicatively coupled to a member activity database 816, a social graph database 818, a member profile database 820, an index database 822, and a company database 824. The databases 816-824 may be implemented as one or more types of databases including, but not limited to, a hierarchical database, a relational database, an object-oriented database, one or more flat files, or combinations thereof.

The member profile database 820 stores member profile information about members who have registered with the online networking server 812. With regard to the member profile database 820, the member may include an individual person or an organization, such as a company, a corporation, a nonprofit organization, an educational institution, or other such organizations.

Consistent with some example embodiments, when a user initially registers to become a member of the online networking service provided by the online networking server 812, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history, professional industry (also referred to herein simply as industry), skills, professional organizations, and so on. This information is stored, for example, in the member profile database 820. Similarly, when a representative of an organization initially registers the organization with the online networking service provided by the online networking server 812, the representative may be prompted to provide certain information about the organization, such as the company industry. This information may be stored, for example, in the member profile database 820. In some embodiments, the profile data may be processed (e.g., in the background or offline) to generate various derived profile data. For example, if a member has provided information about various job titles that the member has held with the same company or different companies, and for how long, this information may be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

In some example embodiment, the index database 822 is used to store one or more of the indices shown in FIG. 5. In some example embodiments, a company database 824 stores information regarding companies in the member's profile. A company may also be a member, but some companies may not be members of the online network although some of the employees of the company may be members of the online network. The company database 824 includes company information, such as name, industry, contact information, website, address, location, geographic scope, and the like.

As users interact with the online networking service provided by the online networking server 812, the online networking server 812 is configured to monitor these interactions. Examples of interactions include, but are not limited to, commenting on posts entered by other members, viewing member profiles, editing or viewing a member's own profile, sharing content outside of the online networking service (e.g., an article provided by an entity other than the online networking server 812), updating a current status, posting content for other members to view and comment on, job suggestions for the members, job-post searches, and other such interactions. In one embodiment, records of these interactions are stored in the member activity database 816, which associates interactions made by a member with his or her member profile stored in the member profile database 820. In one example embodiment, the member activity database 816 includes the posts created by the users of the online networking service for presentation on user feeds.

In one embodiment, the online networking server 812 communicates with the various databases 816-824 through the one or more database server(s) 826. In this regard, the database server(s) 826 provide one or more interfaces and/or services for providing content to, modifying content in, removing content from, or otherwise interacting with the databases 816-824. For example, and without limitation, such interfaces and/or services may include one or more Application Programming Interfaces (APIs), one or more services provided via a Service-Oriented Architecture (SOA), one or more services provided via a REST-Oriented Architecture (ROA), or combinations thereof. In an alternative embodiment, the online networking server 812 communicates with the databases 816-824 and includes a database client, engine, and/or module, for providing data to, modifying data stored within, and/or retrieving data from the one or more databases 816-824.

While the database server(s) 826 is illustrated as a single block, one of ordinary skill in the art will recognize that the database server(s) 826 may include one or more such servers. For example, the database server(s) 826 may include, but are not limited to, a Microsoft® Exchange Server, a Microsoft® Sharepoint® Server, a Lightweight Directory Access Protocol (LDAP) server, a MySQL database server, or any other server configured to provide access to one or more of the databases 816-824, or combinations thereof. Accordingly, and in one embodiment, the database server(s) 826 implemented by the online networking service are further configured to communicate with the online networking server 812.

Figure 9:
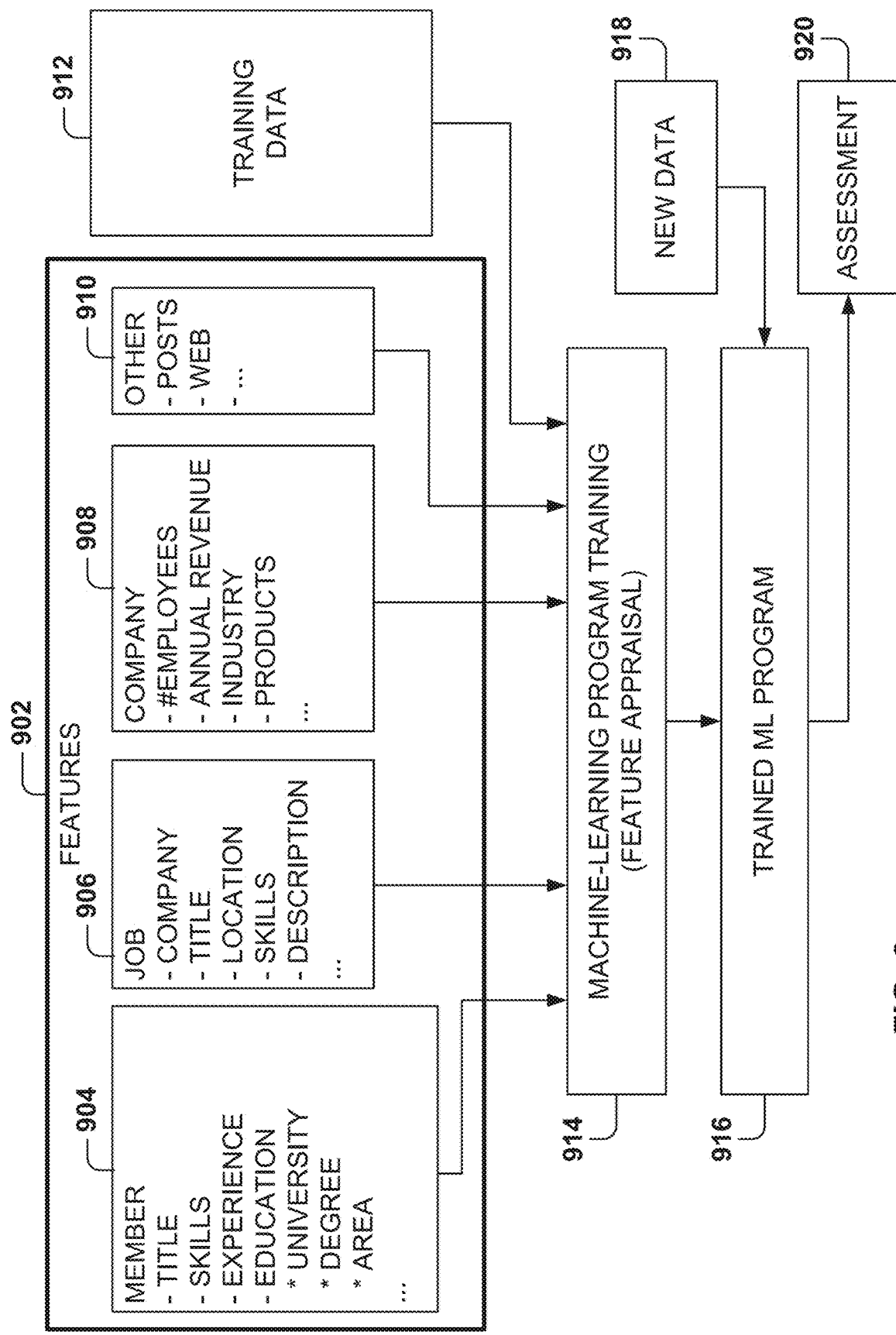
FIG. 9 illustrates the training and use of a machine-learning program, according to some example embodiments.

FIG. 9 illustrates the training and use of a machine-learning program 916, according to some example embodiments. In some example embodiments, machine-learning programs, also referred to as machine-learning algorithms, models, or tools, are utilized to perform operations associated with recommending new connections in an online network.

The machine-learning tools discussed herein operate by building a model from example training data 912 in order to make data-driven predictions or decisions expressed as outputs or assessments 920. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for recommending connections.

Classification problems aim at classifying items into one of several categories (for example, is this object an apple or an orange?). Regression algorithms aim at quantifying some items (for example, by providing a value that is a real number). In some embodiments, example machine-learning algorithms provide a ranking score (e.g., a number from 1 to 100) to qualify each candidate entity as a good suggestion. The machine-learning algorithms utilize the training data 912 to find correlations among identified features 902 that affect the outcome.

In one example embodiment, the features 902 may be of different types and may include one or more of entity features 904, job features 906, company features 908, and other features 910. The entity features 904 may include one or more of the data in the entity profile 302, as described in FIG. 3, such as title, skills, experience, education, and the like. The company features 908 may include any data related to the company. In some example embodiments, additional features in the other features 910 may be included, such as post data, message data, web data, and the like.

With the training data 912 and the identified features 902, the machine-learning tool is trained at operation 914. The machine-learning tool appraises the value of the features 902 as they correlate to the training data 912. The result of the training is the trained machine-learning program 916.

When the machine-learning program 916 is used to perform an assessment, new data 918 is provided as an input to the trained machine-learning program 916, and the machine-learning program 916 generates the assessment 920 as output. For example, when a candidate search is performed, the assessment 920 includes the CS the scores for a plurality of entities in the online network.

An example embodiments, an edge can be formed in the online network through various mediums, including a user interface for PYMK, a user interface for a profile page of an entity, or a user interface for conducting a search of entities.

Figure 10:
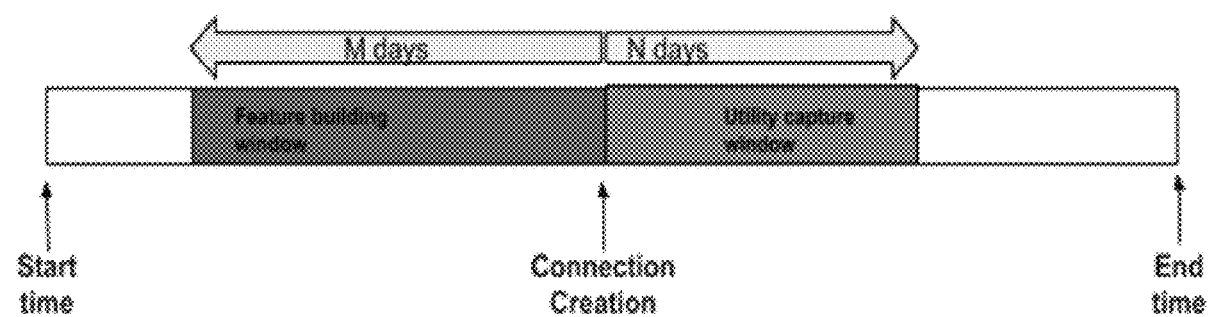
FIG. 10 illustrates an example timeline for training a utility model.

In example embodiments, a connections database is leveraged where we have a creation date of each connection. To generate training data, src and dest pairs are extracted from a time window in order to incorporate members from varying lifecycles, such as:

1. 4×4: Members who visit the system 4 days per week for 4 weeks in a row
2. 1×3: A member who visits the system on average 3 weeks per month
3. 1×1: A member who visits the system on average once per month
4. Dormant
5. Onboarding FIG. 10 illustrates an example timeline for training a utility model. Here's an example breakdown for a training period:

1. Training period: [train_start, train_end]: 2 to 3 months
2. Key days:
  a. Feature collection: M days
  b. Monitor Utility: N days
3. Connection formation period: [conn_start, conn_end]
  a. Earliest connection can be formed at: train_start+M days
  b. Last connection can be formed at: train_end−N days
  c. conn_start=train_start+M
  d. conn_end=train_end−N
4. Feature collection period: Features would be extracted at the time of connection formation or M days before
5. Utility capture period:
  d. Number of days we would like to capture utility for: N days from when connection is formed In example embodiments, for each pair, the days for feature collection and utility measurement depends on the connection creation date, with the above periods only being example bounds.

In example embodiments, the utility model is built over all or a selected subset of connected edges, but, at the time of scoring, the utility model is applied through the second-pass ranking, as described above. Consequently, an impact on edges formed through a particular medium (e.g., PYMK) can be measured.

In example embodiments, a model, such as a log linear regression model, will be trained with one or more of the features, such as the example features described in FIG. 11. In example embodiments, different utility models based on notification utility, feed utility, or network growth utility. Estimates of utility for each additional edge (i.e. $\Delta U/\Delta E$) and estimates of utility for each member also changes over time (i.e. $\Delta U/\Delta T$). Thus, in example embodiments, a state-based model is used to address cannibalization caused by an edge model and can be adapted for how utility changes over time.

In example embodiments, the success criteria for a model is dependent on the definition of the utility. For a model that optimizes for sessions, we expect to see a positive impact on the macrosessions. For a contribution-based utility we expect to see an increase in daily unique contribution, feed engagement metrics, and macrosessions. Since a network growth model is used to encourage members to form connections, metrics pertaining to numbers of sessions and amounts of daily use resulting from the recommendation or formation of each edge may be used.

FIG. 11 is a listing of example features used to train a utility model, including descriptions of each of the features.

Figure 12:
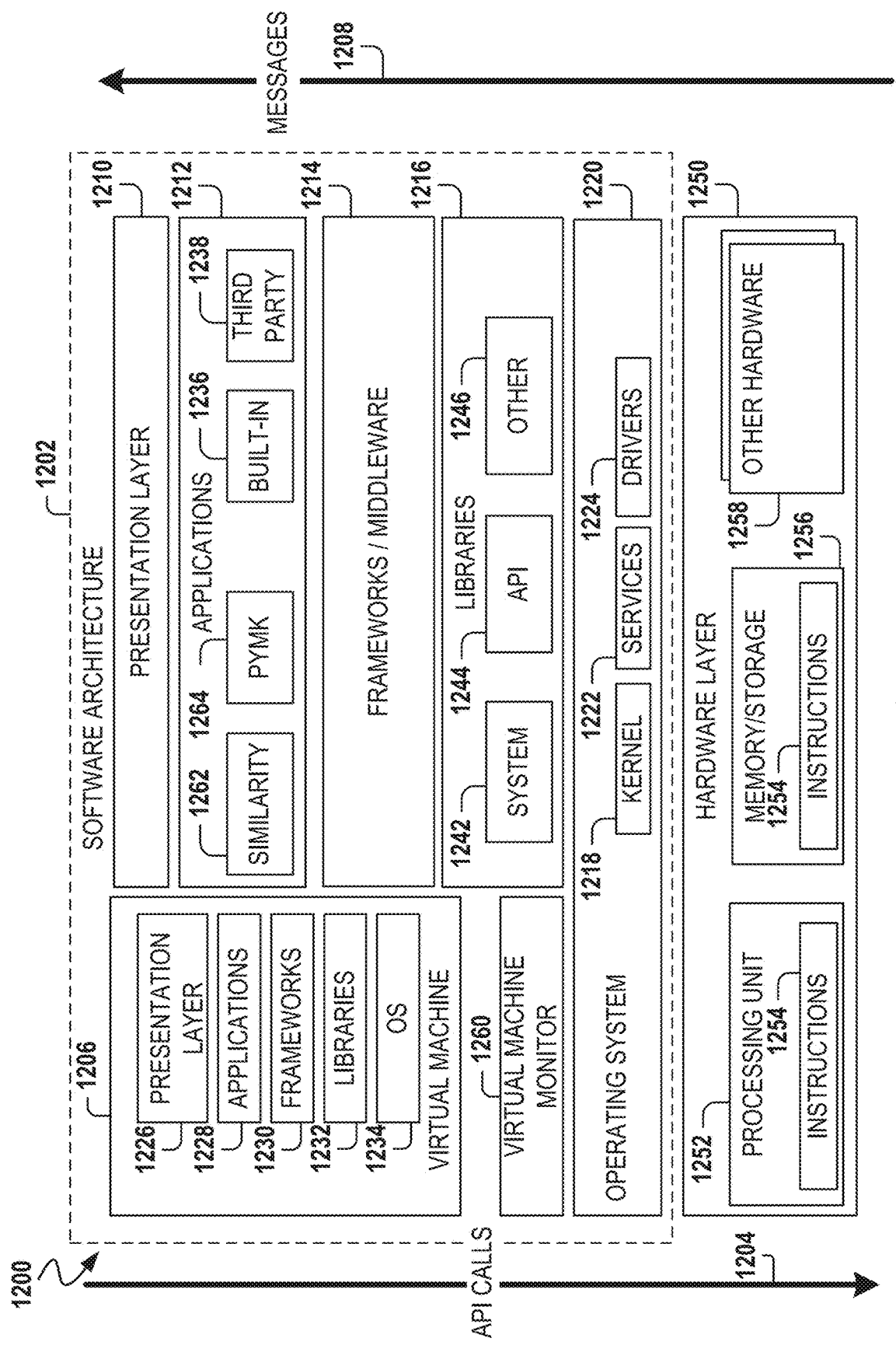
FIG. 12 is a block diagram illustrating an example of a software architecture that may be installed on a machine, according to some example embodiments.

FIG. 12 is a block diagram 1200 illustrating a representative software architecture 1202, which may be used in conjunction with various hardware architectures herein described. FIG. 12 is merely a non-limiting example of a software architecture 1202 and it will be appreciated that many other architectures may be implemented to facilitate the functionality described herein. The software architecture 1202 may be executing on hardware such as a machine 1300 of FIG. 13 that includes, among other things, processors 1304, memory/storage 1306, and input/output (I/O) components 1318. A representative hardware layer 1250 is illustrated and may represent, for example, the machine 1300 of FIG. 13. The representative hardware layer 1250 comprises one or more processing units 1252 having associated executable instructions 1254. The executable instructions 1254 represent the executable instructions of the software architecture 1202, including implementation of the methods, modules and so forth of FIGS. 1-11. The hardware layer 1250 also includes memory and/or storage modules 1256, which also have the executable instructions 1254. The hardware layer 1250 may also comprise other hardware 1258, which represents any other hardware of the hardware layer 1250, such as the other hardware illustrated as part of the machine 1300.

In the example architecture of FIG. 12, the software architecture 1202 may be conceptualized as a stack of layers where each layer provides particular functionality. For example, the software architecture 1202 may include layers such as an operating system 1220, libraries 1216, frameworks/middleware 1214, applications 1212, and a presentation layer 1210. Operationally, the applications 1212 and/or other components within the layers may invoke API calls 1204 through the software stack and receive a response, returned values, and so forth illustrated as messages 1208 in response to the API calls 1204. The layers illustrated are representative in nature and not all software architectures have all layers. For example, some mobile or special purpose operating systems may not provide a frameworks/middleware layer 1214, while others may provide such a layer. Other software architectures may include additional or different layers.

The operating system 1220 may manage hardware resources and provide common services. The operating system 1220 may include, for example, a kernel 1218, services 1222, and drivers 1224. The kernel 1218 may act as an abstraction layer between the hardware and the other software layers. For example, the kernel 1218 may be responsible for memory management, processor management (e.g., scheduling), component management, networking, security settings, and so on. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1212 and/or other components and/or layers. The libraries 1216 typically provide functionality that allows other software modules to perform tasks in an easier fashion than to interface directly with the underlying operating system 1220 functionality (e.g., kernel 1218, services 1222, and/or drivers 1224). The libraries 1216 may include system libraries 1242 (e.g., C standard library) that may provide functions such as memory allocation functions, string manipulation functions, mathematic functions, and the like. In addition, the libraries 1216 may include API libraries 1244 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 1216 may also include a wide variety of other libraries 1246 to provide many other APIs to the applications 1212 and other software components/modules.

The frameworks 1214 (also sometimes referred to as middleware) may provide a higher-level common infrastructure that may be utilized by the applications 1212 and/or other software components/modules. For example, the frameworks 1214 may provide various graphic user interface (GUI) functions, high-level resource management, high-level location services, and so forth. The frameworks 1214 may provide a broad spectrum of other APIs that may be utilized by the applications 1212 and/or other software components/modules, some of which may be specific to a particular operating system or platform.

The applications 1212 include similarity applications 1262, PYMK search 1264, built-in applications 1236, and third-party applications 1238. The similarity applications 1262 are used to calculate similarity values for title, company, school, and the like. Examples of representative built-in applications 1236 may include, but are not limited to, a contacts application, a browser application, a book reader application, a location application, a media application, a messaging application, and/or a game application. The third-party applications 1238 may include any of the built-in applications 1236 as well as a broad assortment of other applications. In a specific example, the third-party application 1238 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1238 may invoke the API calls 1204 provided by the mobile operating system such as the operating system 1220 to facilitate functionality described herein.

The applications 1212 may utilize built-in operating system functions (e.g., kernel 1218, services 1222, and/or drivers 1224), libraries (e.g., system libraries 1242, API libraries 1244, and other libraries 1246), or frameworks/middleware 1214 to create user interfaces to interact with users of the system. Alternatively, or additionally, in some systems, interactions with a user may occur through a presentation layer, such as the presentation layer 1210. In these systems, the application/module "logic" may be separated from the aspects of the application/module that interact with a user.

Some software architectures utilize virtual machines. In the example of FIG. 12, this is illustrated by a virtual machine 1206. A virtual machine creates a software environment where applications/modules may execute as if they were executing on a hardware machine (such as the machine 1300 of FIG. 13, for example). The virtual machine 1206 is hosted by a host operating system (e.g., operating system 1220 in FIG. 12) and typically, although not always, has a virtual machine monitor 1260, which manages the operation of the virtual machine 1206 as well as the interface with the host operating system (e.g., operating system 1220). A software architecture executes within the virtual machine 1206 such as an operating system 1234, libraries 1232, frameworks/middleware 1230, applications 1228, and/or a presentation layer 1226. These layers of software architecture executing within the virtual machine 1206 may be the same as corresponding layers previously described or may be different.

Figure 13:
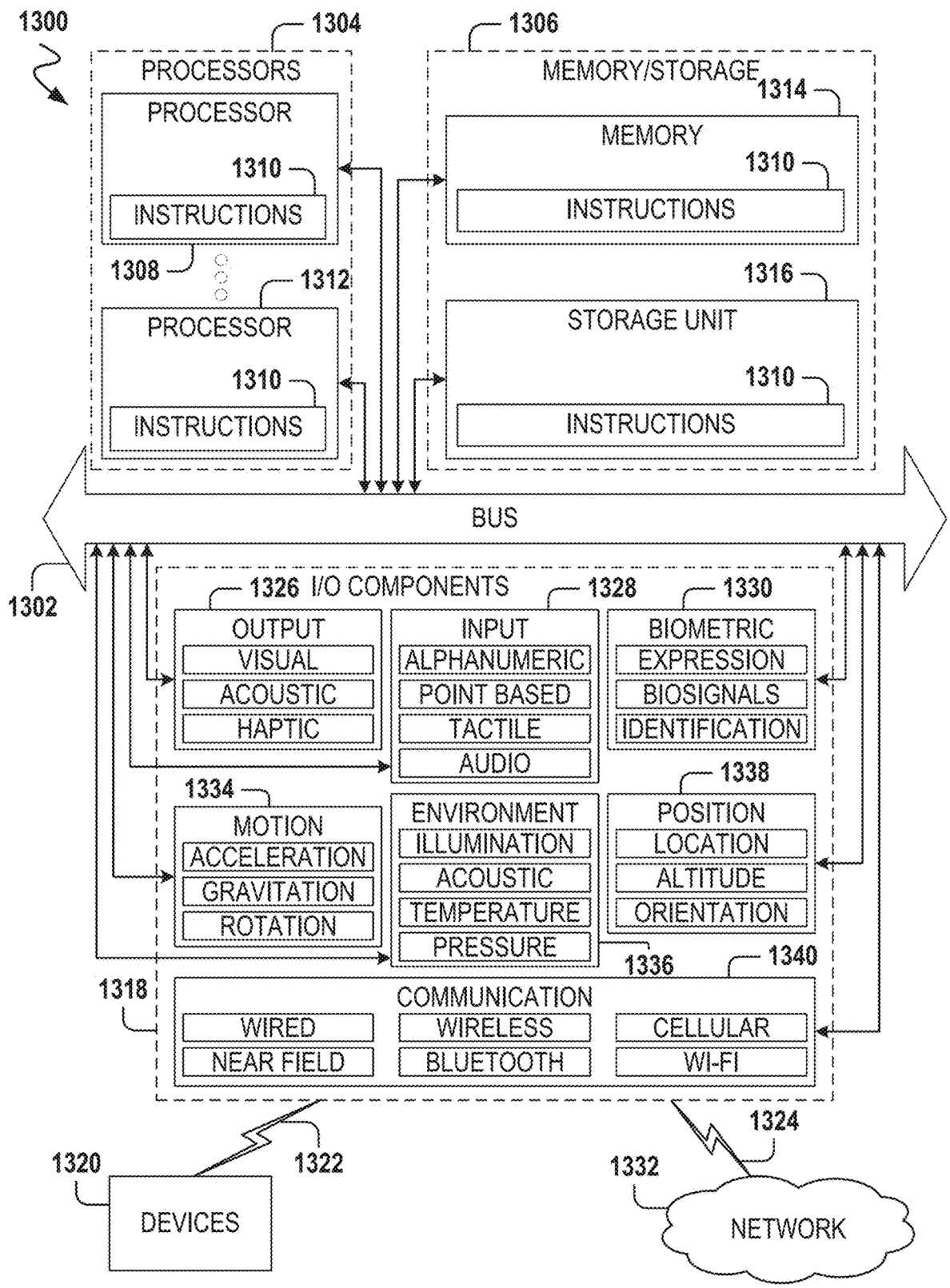
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute the flow diagrams of FIGS. 2, 4, 6, and 9-11. The instructions 1310 transform the general, non-programmed machine 1300 into a particular machine 1300 programmed to carry out the described and illustrated functions in the manner described.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a switch, a controller, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines 1300 that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. In an example embodiment, the processors 1304 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1308 and a processor 1312 that may execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiples cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of the processors 1304 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1310. The term "machine-readable medium" shall also be taken to include any medium, or combination of multiple media, that is capable of storing instructions (e.g., instructions 1310) for execution by a machine (e.g., machine 1300), such that the instructions, when executed by one or more processors of the machine (e.g., processors 1304), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1318 may include a wide variety of components to receive input, provide output, produce output, transmit information, exchange information, capture measurements, and so on. The specific I/O components 1318 that are included in a particular machine will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion, and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322, respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting an NFC beacon signal that may indicate a particular location, and so forth.

In various example embodiments, one or more portions of the network 1332 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1332 or a portion of the network 1332 may include a wireless or cellular network and the coupling 1324 may be a Code Division Multiple Access (CDMA) connection, a Global System for Mobile communications (GSM) connection, or another type of cellular or wireless coupling. In this example, the coupling 1324 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1310 may be transmitted or received over the network 1332 using a transmission medium via a network interface device (e.g., a network interface component included in the communication components 1340) and utilizing any one of a number of well-known transfer protocols (e.g., HTTP). Similarly, the instructions 1310 may be transmitted or received using a transmission medium via the coupling 1322 (e.g., a peer-to-peer coupling) to the devices 1320. The term "transmission medium" shall be taken to include any intangible medium that is capable of storing, encoding, or carrying the instructions 1310 for execution by the machine 1300, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
one or more computer processors;
one or more computer memories;
a set of instructions incorporated into the one or more computer memories, the set of instructions configuring the one or more computer processors to perform operations for facilitating establishment of connections in an online network, the operations comprising:
accessing a set of connection recommendations for a first entity associated with the online network;
for each connection recommendation in the set of connection recommendations, accessing a ranking value associated with the connection recommendation, determining a utility value corresponding to the connection recommendation, and calculating an adjusted ranking value for the connection recommendation, the determining of the utility value including applying a machine-learned model to a set of input features identified as being relevant to the utility value, the utility value being a two-sided utility value that includes a prediction of a utility of the first entity combined with a prediction of a utility of a second entity with respect to a key performance indicator of the online network; and
communicating the set of connection recommendations for presentation in an interactive user interface of a client device associated with the first entity in accordance with the adjusted ranking value of each connection recommendation, the interactive user interface including a user interface element that, when activated by the first entity, facilitates establishment of a connection associated with the set of connections.

2. The system of claim 1, wherein, for each connection recommendation, the ranking value is determined by applying a machine-learned model to a set of input values identified as being relevant to an additional key performance indicator of the online network, the additional key performance indicator pertaining to a number of connections established by the first entity and a number of connections established by the second entity with respect to the online system, the ranking value representing a probability that the first entity will request the establishment of the connection and a probability that the second entity will accept the request.

3. The system of claim 1, wherein the key performance indicator pertains to activity levels of the first entity and activity levels of the second entity with respect to the online network over a period of time.

4. The system of claim 3, wherein the activity levels include a number of sessions engaged in by the first entity and a number of sessions engaged in by the second entity with respect to the online network.

5. The system of claim 3, wherein the activity levels include a number of interactions engaged in by the first entity and a number of interactions engaged in by the second entity with respect to the online network.

6. The system of claim 5, wherein the number of interactions engaged in by the first entity includes a number of contributions by the first entity to a feed presented to the first entity.

7. The system of claim 5, wherein the number of interactions engaged in by the first entity includes a number of notifications responded to by the first entity divided by a number of notifications received by the first entity.

8. A method comprising:
performing, using one or more computer processors of an online network, operations for facilitating establishment of connections in an online network, the operations comprising:
accessing a set of connection recommendations for a first entity associated with the online network;
for each connection recommendation in the set of connection recommendations, accessing a ranking value associated with the connection recommendation, determining a utility value corresponding to the connection recommendation, and calculating an adjusted ranking value for the connection recommendation, the determining of the utility value including applying a machine-learned model to a set of input features identified as being relevant to the utility value, the utility value being a two-sided utility value that includes a prediction of a utility of the first entity combined with a prediction of a utility of a second entity with respect to a key performance indicator of the online network; and
communicating the set of connection recommendations for presentation in an interactive user interface of a client device associated with the first entity in accordance with the adjusted ranking value of each connection recommendation, the interactive user interface including a user interface element that, when activated by the first entity, facilitates establishment of a connection associated with the set of connections.

9. The method of claim 8, wherein, for each connection recommendation, the ranking value is determined by applying a machine-learned model to a set of input values identified as being relevant to an additional key performance indicator of the online network, the additional key performance indicator pertaining to a number of connections established by the first entity and a number of connections established by the second entity with respect to the online system, the ranking value representing a probability that the first entity will request the establishment of the connection and a probability that the second entity will accept the request.

10. The method of claim 8, wherein the key performance indicator pertains to activity levels of the first entity and activity levels of the second entity with respect to the online network over a period of time.

11. The method of claim 10, wherein the activity levels include a number of sessions engaged in by the first entity and a number of sessions engaged in by the second entity with respect to the online network.

12. The method of claim 10, wherein the activity levels include a number of interactions engaged in by the first entity and a number of interactions engaged in by the second entity with respect to the online network.

13. The method of claim 12, wherein the number of interactions engaged in by the first entity includes a number of contributions by the first entity to a feed presented to the first entity.

14. The method of claim 12, wherein the number of interactions engaged in by the first entity includes a number of notifications responded to by the first entity divided by a number of notifications received by the first entity.

15. A non-transitory machine-readable storage medium including instructions that, when executed one or more computer processors, cause the one or more computer processors to perform operations for:

facilitating establishment of connections in an online network, the operations comprising:

accessing a set of connection recommendations for a first entity associated with the online network;

for each connection recommendation in the set of connection recommendations, accessing a ranking value associated with the connection recommendation, determining a utility value corresponding to the connection recommendation, and calculating an adjusted ranking value for the connection recommendation, the determining of the utility value including applying a machine-learned model to a set of input features identified as being relevant to the utility value, the utility value being a two-sided utility value that includes a prediction of a utility of the first entity combined with a prediction of a utility of a second entity with respect to a key performance indicator of the online network; and communicating the set of connection recommendations for presentation in an interactive user interface of a client device associated with the first entity in accordance with the adjusted ranking value of each connection recommendation, the interactive user interface including a user interface element that, when activated by the first entity, facilitates establishment of a connection associated with the set of connections.

16. The non-transitory machine-readable storage medium of claim 15, wherein, for each connection recommendation, the ranking value is determined by applying a machine-learned model to a set of input values identified as being relevant to an additional key performance indicator of the online network, the additional key performance indicator pertaining to a number of connections established by the first entity and a number of connections established by the second entity with respect to the online system, the ranking value representing a probability that the first entity will request the establishment of the connection and a probability that the second entity will accept the request.

17. The non-transitory machine-readable storage medium of claim 15, wherein the key performance indicator pertains to activity levels of the first entity and activity levels of the second entity with respect to the online network over a period of time.

18. The non-transitory machine-readable storage medium of claim 17, wherein the activity levels include a number of sessions engaged in by the first entity and a number of sessions engaged in by the second entity with respect to the online network.

19. The non-transitory machine-readable storage medium of claim 17, wherein the activity levels include a number of interactions engaged in by the first entity and a number of interactions engaged in by the second entity with respect to the online network.

20. The non-transitory machine-readable storage medium of claim 19, wherein the number of interactions engaged in by the first entity includes a number of contributions by the first entity to a feed presented to the first entity.

* * * * *